United States Patent [19]

Liautaud

[11] Patent Number: 4,633,521

[45] Date of Patent: Dec. 30, 1986

[54] REMOTE RADAR DETECTOR CONTROL UNIT

[76] Inventor: James P. Liautaud, 70 Bluff Rd., Cary, Ill. 60013

[21] Appl. No.: 542,589

[22] Filed: Oct. 17, 1983

[51] Int. Cl.⁴ .......................... H05K 5/03; H05K 11/00
[52] U.S. Cl. .................................... 455/345; 455/353; D10/106; D14/85; 342/20
[58] Field of Search .................. D10/12, 27, 104, 106, D10/116, 46; D14/26, 68, 69, 71, 92, 79, 85, 7; 455/344, 347, 345, 352, 353, 355, 90; 340/693; 343/7 VM, 18 E; D12/192, 191

[56] References Cited

U.S. PATENT DOCUMENTS 4,143,320  3/1979  Johnson ............................... 455/90
4,333,076  6/1982  Cachier ........................... 343/5 DD

OTHER PUBLICATIONS

Advertisement for "Superfox Remote", Radar Detector, Motor Trend, Nov., 1980, p. 15.

Primary Examiner—T. H. Tubbesing
Assistant Examiner—Gilberto Barrón, Jr.
Attorney, Agent, or Firm—Hill, Van Santen, Steadman & Simpson

[57] ABSTRACT

A remote radar detector head has a front control unit portion and a rear mounting surface portion which is thinner than the front head portion. The mounting surface portion extends rearwardly of the front head portion and extends downwardly or upwardly at an angle relative to the front head portion depending upon whether the detector head is in a first or inverted second mounting position. At a front panel of the front head portion, first and second escutcheons are provided with indicia inscribed thereon. In the first mounting position the first escutcheon is utilized while in the second or inverse mounting position the second escutcheon is employed with the indicia in reverse location thereon. The radar detector control unit can be conveniently mounted in a variety of locations within an automobile to insure ease of monitoring and control by the driver of the automobile who desires to sense incoming radar pulses.

20 Claims, 19 Drawing Figures

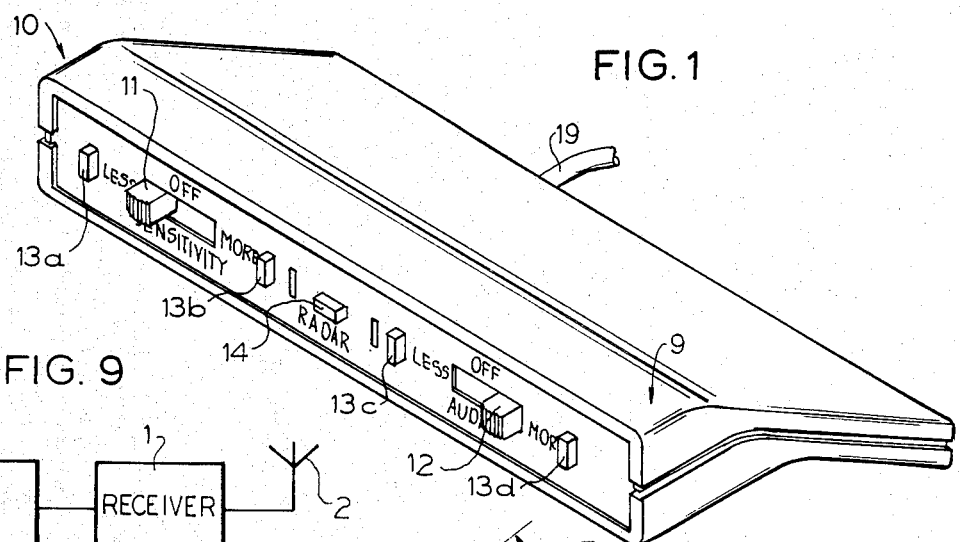
FIG. 1
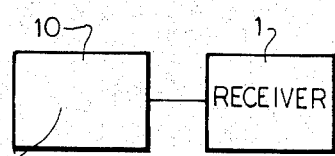
FIG. 9
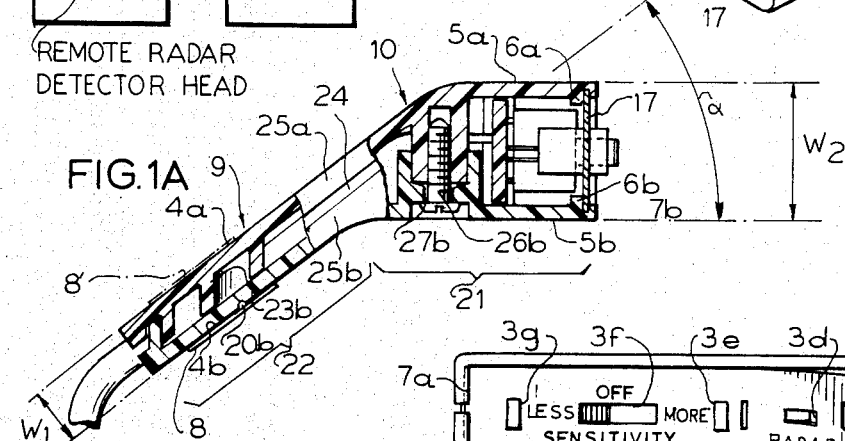
FIG. 1A
FIG. 1B
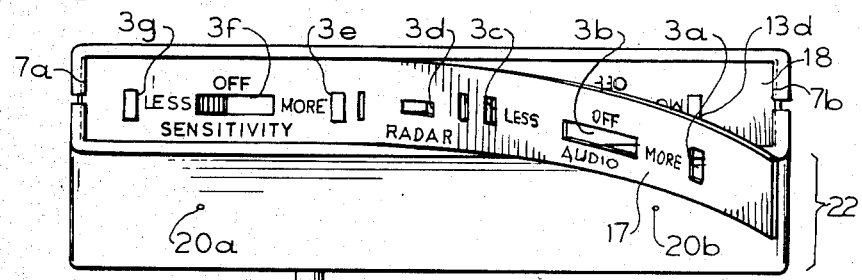
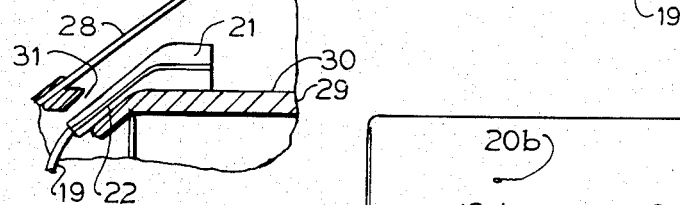
FIG. 2B
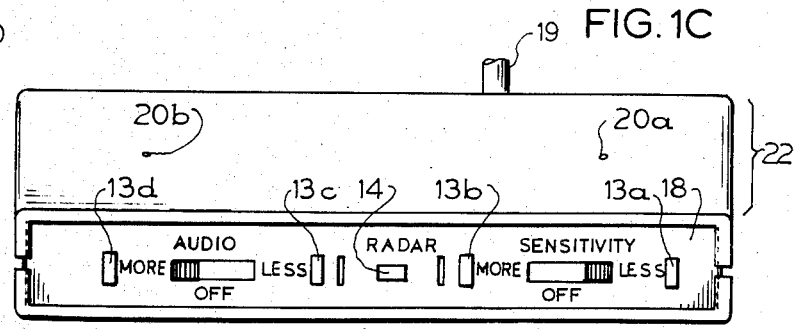
FIG. 1C
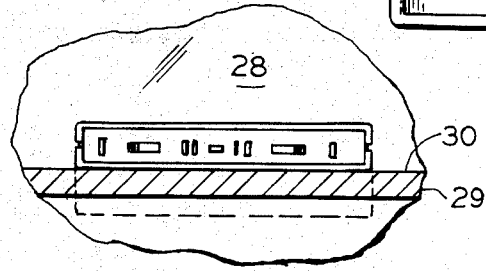
FIG. 2A

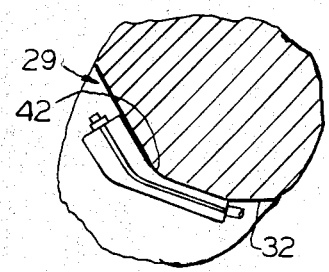
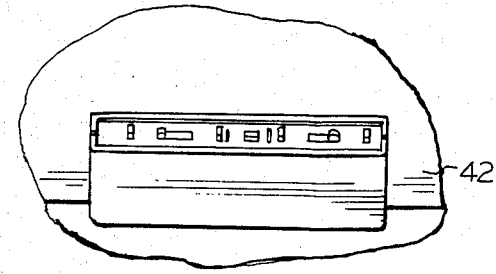
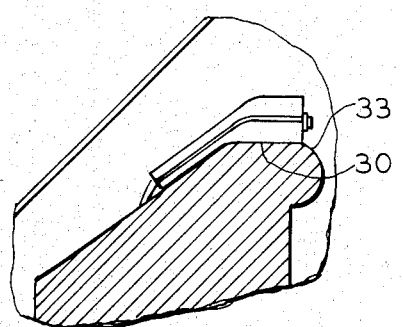
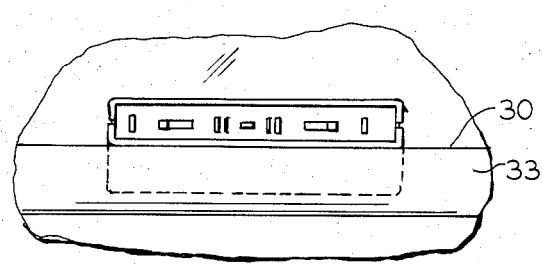
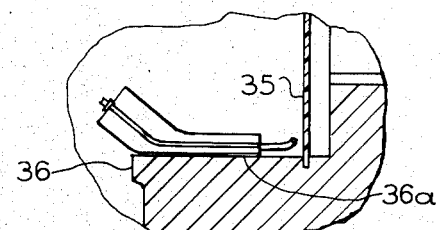
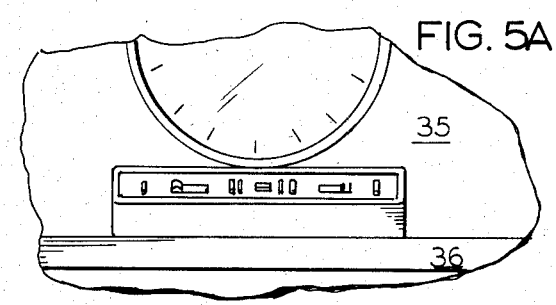
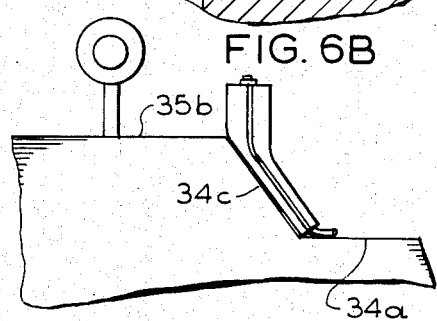
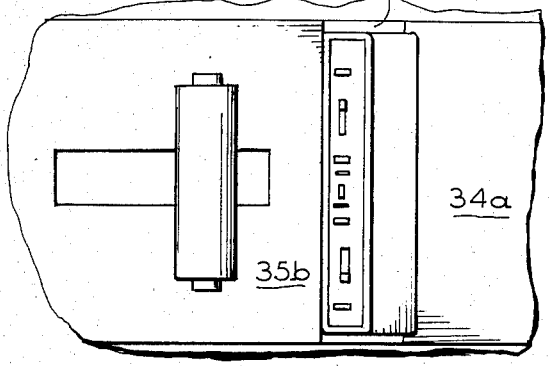
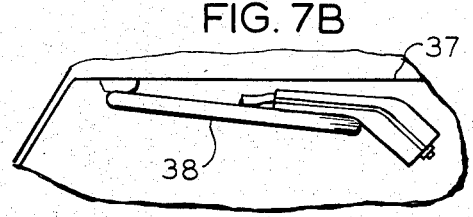
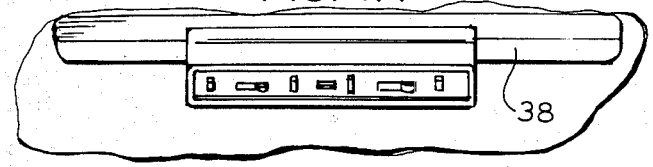
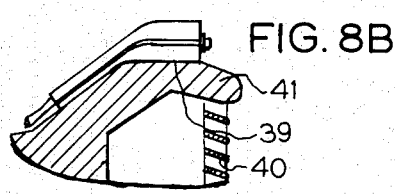
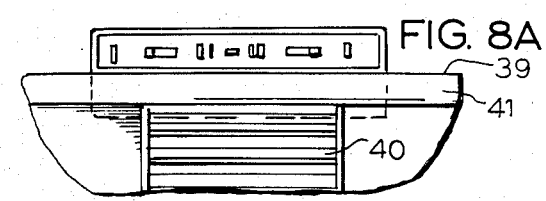

REMOTE RADAR DETECTOR CONTROL UNIT

BACKGROUND OF THE INVENTION

It is known to provide a radar detector in a motor vehicle to detect pulses emanating from speed detecting radar units and to provide the operator of the automotive vehicle an indication of the presence of radar units in the vicinity of the automotive vehicle.

It is also known to provide a receiver and antenna portion of the radar unit at a location remote from a head or control unit for controlling operation of the detector and/or for visual or audible monitoring of received radar pulses. For example, the receiver and antenna may be located under the hood of the automotive vehicle while the head or control unit is mounted at a location convenient to the operator of the automotive vehicle.

SUMMARY OF THE INVENTION

It is an object of the invention to provide a remotely located control unit which can be conveniently mounted on a variety of surfaces and in a variety of locations chosen for operator convenience in monitoring or controlling the radar detecting system.

It is a further object of the invention to provide a remote radar detector control which has a thin profile and occupies minimal space while still permitting convenient mounting.

It is another object of the invention to provide a remotely located radar detector control unit which can be mounted in either a first position or an inverted second position, and wherein front panel indicia on the detector head can be changed depending upon whether the first or second mounting position is utilized.

According to the invention, the remote radar detector control unit comprises a housing with a front head portion and a thinner mounting surface portion extending rearwardly of the front head portion. The thinner mounting surface portion extends rearwardly of the front head portion at an angle greater than 10° and less than 90°. A maximum thickness portion of the front head portion has an overall depth which is substantially less than a depth of the mounting surface portion.

With the radar detector control unit of the invention, the unit can be mounted in either a first position or a reversed or inverted second position. In a first position, a first front panel escutcheon having indicia imprinted thereon is provided. In the second or inverted position, a second front panel escutcheon is utilized having indicia with reversed locations relative to the first escutcheon indicia.

BRIEF DESCRIPTION OF THE DRAWINGS

FIG. 1 is a perspective view of the remote radar detector control unit of the invention;

FIG. 1A is a side cross-sectional view of the detector control unit taken along line IA—IA of FIG. 1;

FIG. 1B is a front view of the detector control unit of FIG. 1;

FIG. 1C is a front view of the radar detector control unit in a second or inverted mounting position;

FIG. 2A is a front view of the detector control unit mounted on a dashboard of an automotive vehicle and adjacent the windshield;

FIG. 2B is a side view of the detector control unit according to FIG. 2A;

FIG. 3A is a front view of the detector control unit mounted beneath a dashboard;

FIG. 3B is a side view of the detector control unit as shown in FIG. 3A;

FIG. 4A is a front view of the detector control unit mounted at a leading edge of the dashboard;

FIG. 4B is a side view of the detector control unit according to FIG. 4A;

FIG. 5A is a front view of the detector control unit mounted at an operating console of the automotive vehicle;

FIG. 5B is a side view of the detector control unit shown in FIG. 5A;

FIG. 6A is a top view of the detector control unit mounted at a floor console of the automotive vehicle;

FIG. 6B is a side view of the detector control unit according to FIG. 6A;

FIG. 7A is a front view of the detector control unit mounted on a windshield visor;

FIG. 7B is a side view of the detector control unit mounted according to FIG. 7A;

FIG. 8A is a front view of the detector control unit mounted on a dashboard projecting surface such as above an air conditioner; and FIG. 8B is a side view of the detector control unit mounted according to FIG. 8A.

FIG. 9 is a block diagram of the radar detector system.

DESCRIPTION OF THE PREFERRED EMBODIMENTS

The remote radar detector control unit according to the invention is generally illustrated at 10 in FIG. 1. The detector control unit contains either operating controls or signalling apparatus to indicate the presence of radar signals emanating from speed detecting radar units. In the embodiment shown herein, the detector control unit 10 has a sensitivity switch 11 for changing detector sensitivity and an audio switch 12 for changing loudness of an audio alarm. In addition, a radar detection light 14 may be provided together with additional indicator lights 13a, b, c, and d.

The control cable 19 runs from a rear portion of the detector control unit housing 9 to a receiver 1 and antenna 2 shown in FIG. 9 of the drawings. The receiver 1, for example, as known in the prior art, may be mounted beneath the hood together with the antenna 2.

A first front escutcheon 17 is provided which overlays a second front escutcheon 18 as shown in FIG. 1B behind a peeled back portion of escutcheon 17. The first and second front escutcheons 17 and 18 are mounted by use of mounting lips 7a and 7b at the short sides of the front of the housing which overlap left and right side edges of the escutcheons so as to press the escutcheons and retain them against mounting channels 6a and 6b running laterally along the top and bottom of the housing 9 at the front thereof.

The housing 9 is formed of an upper portion 25a and lower portion 25b which abut and are joined to one another along a junction or border area 24 as shown in FIG. 1A.

As most clearly illustrated in FIG. 1A, the detector control unit 10 has a front head portion 21 and a rearwardly extending mounting surface portion 22. Preferably at the mounting surface portion 22 a double-sided tape 8 is provided on a bottom surface of the mounting surface portion 22. An alternate location for the double-sided tape 8 is shown at 8' in dotted lines on a top surface of the mounting surface portion 22. The mounting surface portion extends rearwardly of the front head portion in such manner that an angle α is formed between a plane which is parallel to the upper and lower surfaces of the mounting surface portion 22 and a plane which is parallel to the upper and lower surfaces of the front head portion 21.

A width $W_1$ of the mounting surface portion between the upper and lower surfaces thereof is substantially less than a width $W_2$ between the upper and lower surfaces of the front head portion 21. The width $W_1$ is preferably one-half the width $W_2$ of the head portion or less.

In the bottom surface of the mounting surface portion 22 pilot dimples or holes 20a and 20b are provided which are centered with respect to mounting hole reinforcement pillars 23a (not shown) and 23b provided between the upper and lower surfaces of the mounting surface portion. Additionally, apertures 27a (not shown) and 27b may be provided in a bottom surface of the front head portion for receiving fastening screws 26a (not shown) and 26b for fastening the upper and lower housing portions 25a and 25b together.

Preferably the front head portion 21 having upper surface 5a and lower surface 5b is shaped such that the upper surface 5a has less depth than the lower surface 5b as shown in FIG. 1A. Also, the upper surface 4a of the mounting portion 22 is longer or has a greater depth than the lower surface 4b of the mounting surface portion. Additionally, the upper surface 5a of the front head portion 21 has a substantially shorter depth than a depth of the upper surface 4a of the mounting surface portion 22. Finally, over a majority of the depth of the overall unit, the thickness is less than thickness or width $W_2$ of the front head portion 21.

As shown in FIG. 1B, the first escutcheon 17 may be lifted freely from the device. Apertures 3a–3g are provided in both the first and second escutcheons 17 and 18 to permit a portion of the switches 11 and 12 or indicators 13 and 14 to freely pass therethrough.

As shown by a comparison of FIGS. 1B and 1C, when the detector control unit is in a reverse or inverted position of FIG. 1C, the mounting surface portion 22 slopes upwardly whereas in the first position shown in FIG. 1B, the mounting surface portion 22 is sloped or angled downwardly. For the reverse position, as shown in FIG. 1C, the first escutcheon 17 is removed such that the second escutcheon 18 is provided having the indicia printed thereon in reverse or opposite sequence. This is necessary since in the inverted position, the switches 11 and 12 and appropriate indicators 13a, b, c, d are reversed.

Referring again to FIG. 1A, in the cross-sectional view it can be seen that a printed circuit board 8 may be provided parallel to a major surface of the front escutcheons 17 and 18 such that components mounted on the PC board extend through the apertures 3a–3g and the escutcheons 17 and 18. This PC board has most if not all of the electrical components for the radar detector control unit mounted thereon.

Now referring to FIGS. 2A, B, 3A, B, 4A, B, 5A, B, 6A, B, 7A, B, and 8A, B, the wide variety of convenient mounting positions for the radar detector control unit are illustrated. Because of the unique shape of the housing 9, the detector control unit can be aesthetically mounted with a minimum height profile with respect to the mounting surface. By providing the angle α in the range between 10° and 90° the radar detector control unit is uniquely suited for a variety of mounting positions.

Instead of providing two front escutcheons, alternatively a single escutcheon could be provided having the respective indicia for first and second position mounting on reverse sides thereof. Also, an adhesive may be provided on the first escutcheon 17 before adhering to the second escutcheon 18. When it is desired to utilize only the second escutcheon 18, the top escutcheon 17 may be peeled free.

As shown in FIGS. 2A and 2B, the radar detector head is particularly well suited for mounting between a windshield 28 and upper surface 30 of a dashboard 29. The relatively thin mounting surface portion 22 will easily fit at the convergence between the windshield 28 and upper surface 30 and in many cases where a heater or vent opening 31 is provided at the convergence, the mounting surface portion 22 will slip into such opening and may be thus concealed so that substantially only the front head portion 21 is visible.

As shown in FIGS. 3A and 3B, the radar detector control unit may be mounted to an undersurface 32 at a leading edge 42 of the dashboard 29.

It should be noted that the mounting position shown in FIG. 1B is utilized for the upper-surface mounting and the position shown in FIG. 1C with the mounting surface portion 22 slanting upwardly is utilized for the under-surface mounting.

FIGS. 4A and 4B show an upper-surface mounting wherein the radar detector head is mounted on an upper surface 30 of the dashboard at a leading edge 33 thereof.

As shown in FIGS. 5A and 5B, an operator control panel 35 behind the steering wheel having a frame 36 surrounding it may provide a mounting surface as generally shown in the drawings. For example at a lower surface 36a of the frame 36 the unit may be attached by the double-sided adhesive tape 8' shown in FIG. 1A.

As shown in FIGS. 6A and 6B, the radar detector head may be mounted at a floor control console at a transition point between a carpeted portion 34a and the control panel 35b having a gear shift or ash tray, for example. The unit may be mounted to a sloping edge 34c at the transition point.

As shown in FIGS. 7A and 7B, the unit may be mounted directly adjacent the vehicle roof 37 on a visor 38.

FIG. 8A shows the control head mounted on an upper surface 39 of an extending portion 41 which extends upwardly from a dashboard or control panel such as for an air conditioner vent 40, radio, or other instrumentation.

In the variety of locations described, the unit may be mounted either with the double-sided adhesive tape or the mounting holes by boring through at the guide holes or dimples 20a, 20b.

Although various minor changes and modifications might be proposed by those skilled in the art, it will be understood that I wish to include within the claims of the patent warranted hereon all such changes and modifications as reasonably come within my contribution to the art.

I claim as my invention:

1. A remote radar detector control unit for use with a remotely located receiver, comprising:
    control means electrically connected to function with the receiver;

a housing containing the control means and having a front head portion and a rearwardly protruding mounting surface portion;

the front head portion having upper and lower substantially parallel surfaces and the mounting surface portion having substantially parallel upper and lower mounting surfaces;

an angle defined by a first plane parallel to at least one of the upper and lower surfaces of the front head portion and a second plane parallel to at least one of the upper and lower surfaces of the mounting surface portion being greater than 10° and less than 90° so that the housing is compatible with a first position mounting or an inverted second position mounting; and a thickness between the upper and lower surfaces of the front head portion being at least approximately twice as great as a thickness between the upper and lower surfaces of the mounting surface portion.

2. A radar detector control unit according to claim 1 wherein the upper surface of the front head portion has a substantially lesser depth than a depth of the upper surface of the mounting surface portion.

3. A control unit according to claim 1 wherein said thickness between the upper and lower surfaces of the front head portion is more than twice as great as said thickness between the upper and lower surfaces of the mounting surface portion.

4. A control unit according to claim 1 wherein the control means comprises indicators and operator controls.

5. A control unit according to claim 1 wherein escutcheon means are provided at a front of the housing for providing indicia in association with the control means, said escutcheon means having a first set of indicia corresponding to a mounting of the control head wherein the lower surface of the mounting surface portion abuts a mounting area and a second set of indicia correspond to mounting of the control head wherein the upper surface of the mounting surface portion abuts a mounting area.

6. A control unit according to claim 1 wherein the housing comprises upper and lower housing portions and a printed circuit board is mounted within the control head parallel to a front escutcheon such that components mounted on the circuit board project through apertures in the escutcheon.

7. A control unit according to claim 1 wherein the control means comprise an on-off control and a radar detection indicating light.

8. A control unit according to claim 1 wherein the control means comprises an audio control for setting a loudness of an alarm signal.

9. A control unit according to claim 1 wherein the control means comprises a sensitivity adjustment for changing sensitivity of detected radar signals.

10. A control unit according to claim 1 wherein the control means comprises an audio switch and a sensitivity switch together with a radar indicator light at a front escutcheon of the control head.

11. A control unit according to claim 1 wherein said angle between 10° and 90° is chosen such that in the first mounting position the mounting surface portion will project rearwardly and downwardly of the front head portion toward a convergence between a windshield and upper dash surface and in the second inverse mounting position said mounting surface portion will abut against a rounded leading edge of an undersurface of a dash and the front head portion will be angled substantially upwardly.

12. A control unit according to claim 1 wherein a double-sided tape is provided which is adapted for mounting on either the upper or lower surface of the mounting surface portion depending upon whether the detector head is mounted in the first position or second inverse position.

13. An automotive radar detector control unit system comprising:

an automobile;

a radar detector control unit mounted at a position near an operating position for the automobile and so as to permit a driver of the automobile to view and have access to a front panel of the control unit;

the control unit having control means and a housing with a front head portion and a rearwardly extending mounting surface portion;

the front head portion having parallel upper and lower surfaces and the mounting surface portion having parallel upper and lower mounting surfaces which abut against a mounting area of the motor vehicle depending upon whether the unit is mounted in a first position or an inverted second position;

a thickness between the front head portion upper and lower surfaces being substantially greater than a thickness between the upper and lower surfaces of the mounting surface portion;

an angle defined between a first plane parallel to one of the upper and lower surfaces of the front head portion and a second plane parallel to one of the upper and lower mounting surface portion surfaces lying between 10° and 90°; and escutcheon means on the front panel which provide a corresponding set of indicia for the corresponding first or second position mounting.

14. A system according to claim 13 wherein in the first mounting position the unit is adapted for mounting such that the mounting surface portion extends into a convergence between a windshield and an upper surface of a dash, and in the second inverted position the upper surface of the mounting surface portion abuts against a lower surface of a dash for undersurface mounting.

15. A remote detector control unit housing, comprising:

a front head portion and a rearwardly and downwardly extending mounting surface portion, said mounting surface portion being defined by upper and lower mounting surfaces which are approximately parallel to one another and are each adapted for mounting the control head housing in either a first position or inverted second position;

first and second escutcheons on the front panel one behind the other, the first providing a first set of indicia for the first position mounting and the second providing a set of indicia for the second position mounting; and the mounting surface portion extending downwardly in the first mounting position and upwardly in the second mounting position.

16. The housing of claim 15 wherein a thickness of a major portion of the mounting surface portion is substantially less than a thickness of a major portion of the front head portion.

17. The housing of claim 15 wherein the first and second escutcheons are provided with control opening locations and shapes which are all the same in both excutcheons.

18. A remote control unit for use by a driver of an automotive vehicle, comprising:
   control means at a first location in the automative vehicle electrically connected to function with and control electronic circuitry at another location of the automotive vehicle;
   a housing containing the control means and having a front head portion and a rearwardly protruding mounting surface portion;
   the front head portion having upper and lower substantially parallel surfaces and the mounting surface portion having substantially parallel upper and lower mounting surfaces;
   an angle defined by a first plane parallel to at least one of the upper and lower surfaces of the front head portion and a second plane parallel to at least one of the upper and lower surfaces of the mounting surface portion being greater than 10° and less than 90° so that the housing is compatible with a first position mounting or an inverted second position mounting; and
   a thickness between the upper and lower surfaces of the front head portion being at least approximately twice as great as a thickness between the upper and lower surfaces of the mounting surface portion.

19. An automotive control unit system for operation by a driver of an automobile, comprising:
   an automobile;
   a control unit mounted at a position near an operating position for the automobile and so as to permit the driver of the automobile to view and have access to a front panel of the control unit;
   the control unit having control means and a housing with a front head portion and a rearwardly extending mounting surface portion;
   the front head portion having parallel upper and lower surfaces and the mounting surface portion having parallel upper and lower mounting surfaces which abut against a mounting area of the motor vehicle depending upon whether the unit is mounted in a first position or an inverted second position;
   a thickness between the front head portion upper and lower surfaces being substantially greater than a thickness between the upper and lower surfaces of the mounting surface portion;
   an angle defined between a first plane parallel to one of the upper and lower surfaces of the front head portion and a second plane parallel to one of the upper and lower mounting surface portion surfaces lying between 10° and 90°; and
   escutcheon means on the front panel which provide a corresponding set of indicia for the corresponding first or second position mounting.

20. A remote control unit housing for use in an automobile and which is positioned near a driver of the automobile, comprising:
   a front head portion and a rearwardly and downwardly extending mounting surface portion, said mounting surface portion being defined by upper and lower mounting surfaces which are approximately parallel to one another and are each adapted for mounting the control head housing in either a first position or inverted second position;
   first and second escutcheons on the front panel one behind the other, the first providing a first set of indicia for the first position mounting and the second providing a set of indicia for the second position mounting; and
   the mounting surface portion extending downwardly in the first mounting position and upwardly in the second mounting position.

* * * * *